United States Patent
Khon

(10) Patent No.: US 11,023,165 B2
(45) Date of Patent: Jun. 1, 2021

(54) MEMORY CONTROL CIRCUIT UNIT, STORAGE DEVICE AND METHOD INCLUDING SELECTIVELY PERFORMING OR IGNORING COMMANDS IN A COMMAND QUEUE AFTER A POWER GLITCH

(71) Applicant: PHISON ELECTRONICS CORP., Miaoli (TW)

(72) Inventor: Luong Khon, Ho Chi Minh (VN)

(73) Assignee: PHISON ELECTRONICS CORP., Miaoli (TW)

( * ) Notice: Subject to any disclaimer, the term of this patent is extended or adjusted under 35 U.S.C. 154(b) by 4 days.

(21) Appl. No.: 16/048,355

(22) Filed: Jul. 30, 2018

(65) Prior Publication Data
US 2019/0369916 A1    Dec. 5, 2019

(30) Foreign Application Priority Data
Jun. 1, 2018    (TW) .................................. 107119008

(51) Int. Cl.
*G06F 3/06* (2006.01)
(52) U.S. Cl.
CPC .......... *G06F 3/0659* (2013.01); *G06F 3/0604* (2013.01); *G06F 3/0652* (2013.01); *G06F 3/0679* (2013.01)
(58) Field of Classification Search
CPC .... G06F 3/0659; G06F 3/0604; G06F 3/0652; G06F 3/0679; G06F 12/00; G06F 13/00
See application file for complete search history.

(56) References Cited

U.S. PATENT DOCUMENTS

| | | | |
|---|---|---|---|
| 7,340,576 B1* | 3/2008 | Therene | G06F 12/0804 711/112 |
| 2010/0226170 A1* | 9/2010 | Lin | G11C 5/141 365/185.03 |

(Continued)

FOREIGN PATENT DOCUMENTS

| | | |
|---|---|---|
| CN | 102054534 | 5/2011 |
| CN | 103403808 | 11/2013 |

*Primary Examiner* — Tuan V Thai
(74) *Attorney, Agent, or Firm* — JCIPRNET

(57) ABSTRACT

A memory management method for a memory storage device including a rewritable non-volatile memory (RNVM) module is provided. The memory management method includes: receiving a plurality of commands; detecting a power glitch; and sending a command sequence which instructs the (RNVM) module to perform a first operation according to a first command among the plurality of commands and to ignore a second command among the plurality of commands after the power glitch occurs. A command queue may be scanned, and scanning may be suspended and the command queue resumed if a first-type command, such as an erase command or a write command, is found, or scanning continued if a second-type command, such as a read command, is found. A memory control circuit unit may proceed with a programming operation if it determines a write command is a non-full sequential programming command. Other commands may be suspended after a programming operation is completed according to a specific mark in a full sequential programming command. Depending on whether a read DMA command is found when scanning the command queue, read commands may be selectively invalidated or sent to the rewritable non-volatile memory module.

21 Claims, 11 Drawing Sheets

(56) References Cited

U.S. PATENT DOCUMENTS

| | | | |
|---|---|---|---|
| 2010/0287391 A1* | 11/2010 | Ochiai | G06F 1/3275 |
| | | | 713/320 |
| 2011/0107012 A1* | 5/2011 | Kan | G11C 16/22 |
| | | | 711/103 |
| 2011/0161554 A1* | 6/2011 | Selinger | G06F 13/1668 |
| | | | 711/103 |
| 2012/0011303 A1* | 1/2012 | Iwasaki | G06F 3/0611 |
| | | | 711/103 |
| 2013/0339590 A1* | 12/2013 | Tsuruda | G11C 16/225 |
| | | | 711/103 |
| 2016/0132384 A1* | 5/2016 | Ko | G06F 11/0793 |
| | | | 714/6.11 |
| 2016/0231957 A1* | 8/2016 | Erez | G06F 3/0625 |
| 2017/0068480 A1* | 3/2017 | Huang | G06F 13/4291 |
| 2018/0349240 A1* | 12/2018 | Ji | G06F 11/2094 |

\* cited by examiner

MEMORY CONTROL CIRCUIT UNIT, STORAGE DEVICE AND METHOD INCLUDING SELECTIVELY PERFORMING OR IGNORING COMMANDS IN A COMMAND QUEUE AFTER A POWER GLITCH

CROSS-REFERENCE TO RELATED APPLICATION

This application claims the priority benefit of Taiwan application serial no. 107119008, filed on Jun. 1, 2018. The entirety of the above-mentioned patent application is hereby incorporated by reference herein and made a part of this specification.

BACKGROUND

Technical Field

The disclosure relates to memory technology, and more particularly, to a memory management unit, a memory storage device and a memory control circuit unit.

Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., flash memory) ideal to be built in the portable multi-media devices as cited above.

During operation of a memory storage device, a power glitch may occur without warning. Such power glitch may cause great changes in a power supply of the memory storage device in a short time. In general, once the power glitch occurs, the memory storage device would activate a reset mechanism to clear a buffer memory (including a command queue in the buffer memory) and back up data yet to be written. However, if the memory storage device only briefly experiences the power glitch and immediately recover to a normal power supply, the reset mechanism would often take a lot of time and drop system performance.

Nothing herein should be construed as an admission of knowledge in the prior art of any portion of the present disclosure. Furthermore, citation or identification of any document in this application is not an admission that such document is available as prior art to the present disclosure, or that any reference forms a part of the common general knowledge in the art.

SUMMARY

Exemplary embodiments of the disclosure provide a memory management method, a memory storage device and a memory control circuit unit which are capable of improving a system recovery efficiency when a power glitch occurs.

An exemplary embodiment of the disclosure provides a memory management method for a memory storage device having a rewritable non-volatile memory module. The memory management method includes: receiving a plurality of commands; detecting a power glitch; and sending a command sequence which instructs the rewritable non-volatile memory module to perform a first operation according to a first command among the plurality of commands and to ignore a second command among the plurality of commands after the power glitch occurs.

An exemplary embodiment of the disclosure further provides a memory storage device, which includes a connection interface unit, a rewritable non-volatile memory module and a memory control circuit unit. The connection interface unit is configured to be coupled to a host system. The memory control circuit unit is coupled to the connection interface unit and the rewritable non-volatile memory module. The memory control circuit unit is configured to receive a plurality of commands. The memory control circuit unit is further configured to detect a power glitch. The memory control circuit unit is further configured to send a command sequence which instructs the rewritable non-volatile memory module to perform a first operation according to a first command among the plurality of commands and to ignore a second command among the plurality of commands after the power glitch occurs.

An exemplary embodiment of the disclosure further provides a memory control circuit unit, which is configured to control a rewritable non-volatile memory module. The memory control circuit unit includes a host interface, a memory interface, a buffer memory and a memory management circuit. The host interface is configured to be coupled to a host system. The memory interface is configured to be coupled to the rewritable non-volatile memory module. The memory management circuit is coupled to the host interface, the memory interface and the buffer memory. The memory management circuit is configured to receive a plurality of commands. The memory management circuit is further configured to detect a power glitch. The memory management circuit is further configured to send a command sequence which instructs the rewritable non-volatile memory module to perform a first operation according to a first command among the plurality of commands and to ignore a second command among the plurality of commands after the power glitch occurs.

Based on the above, after multiple commands are received, if the power glitch occurs, at least part of the commands (i.e., the first command) among the commands may be (repeatedly) executed, and at least part of the commands (i.e., the second command) may be ignored. As a result, the system recovery efficiency may be improved when a power glitch occurs.

To make the above features and advantages of the disclosure more comprehensible, several embodiments accompanied with drawings are described in detail as follows.

It should be understood, however, that this Summary may not contain all of the aspects and embodiments of the present disclosure, and is not meant to be limiting or restrictive in any manner. The disclosure herein should be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
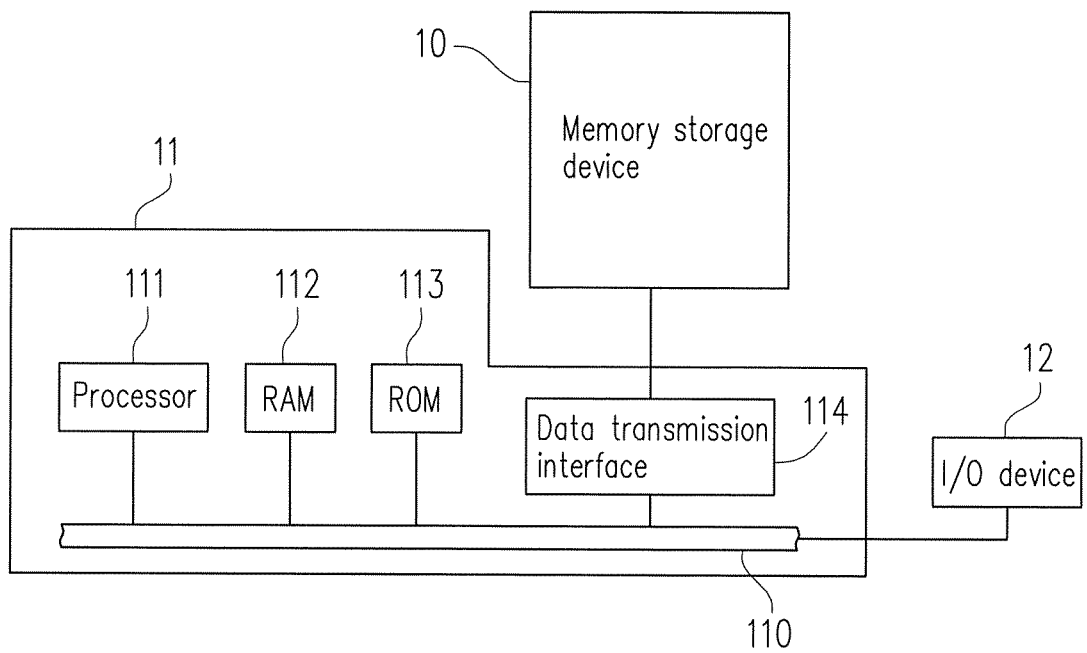
FIG. 1 is a schematic diagram illustrating a host system, a memory storage device and an I/O (input/output) device according to an exemplary embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Embodiments of the present disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In general, a memory storage device (a.k.a. a memory storage system) includes a rewritable non-volatile memory module and a controller (a.k.a. a control circuit). The memory storage device usually operates together with a host system so the host system can write data into the memory storage device or read data from the memory storage device.

Figure 2:
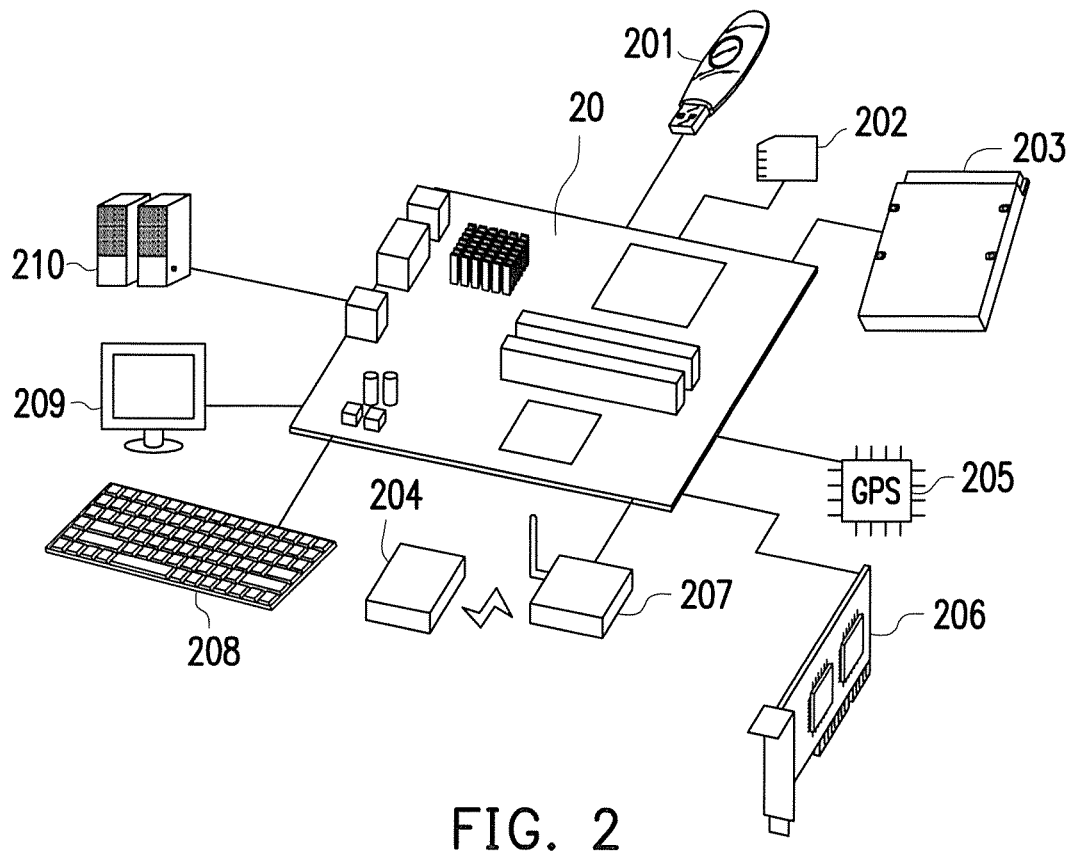
FIG. 2 is a schematic diagram illustrating a host system, a memory storage device and an I/O device according to another exemplary embodiment of the disclosure.

FIG. 1 is a schematic diagram illustrating a host system, a memory storage device and an I/O (input/output) device according to an exemplary embodiment of the disclosure. FIG. 2 is a schematic diagram illustrating a host system, a memory storage device and an I/O device according to another exemplary embodiment of the disclosure.

Referring to FIG. 1, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In the present exemplary embodiment, the host system 11 is coupled to a memory storage device 10 through the data transmission interface 114. For example, the host system 11 can store data into the memory storage device 10 or read data from the memory storage device 10 through the data transmission interface 114. Further, the host system 11 is coupled to an I/O device 12 via the system bus 110. For example, the host system 11 can transmit output signals to the I/O device 12 or receive input signals from the I/O device 12 via the system bus 110.

Referring to FIG. 1 and FIG. 2, in the present exemplary embodiment, the processor 111, the RAM 112, the ROM 113 and the data transmission interface 114 may be disposed on a main board 20 of the host system 11. The number of data transmission interfaces 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication) memory storage device, a WiFi (Wireless Fidelity) memory storage device, a Bluetooth® memory storage device, or a BLE (Bluetooth® low energy) memory storage device (e.g., iBeacon). Further, the main board 20 may also be coupled to various I/O devices including a GPS (Global Positioning System) module 205, a network interface card (NIC) 206, a wireless transmission device 207, a keyboard 208, a monitor 209 and a speaker 210 through the system bus 110. For example, in an exemplary embodiment, the main board 20 can access the wireless memory storage device 204 via the wireless transmission device 207.

Figure 3:
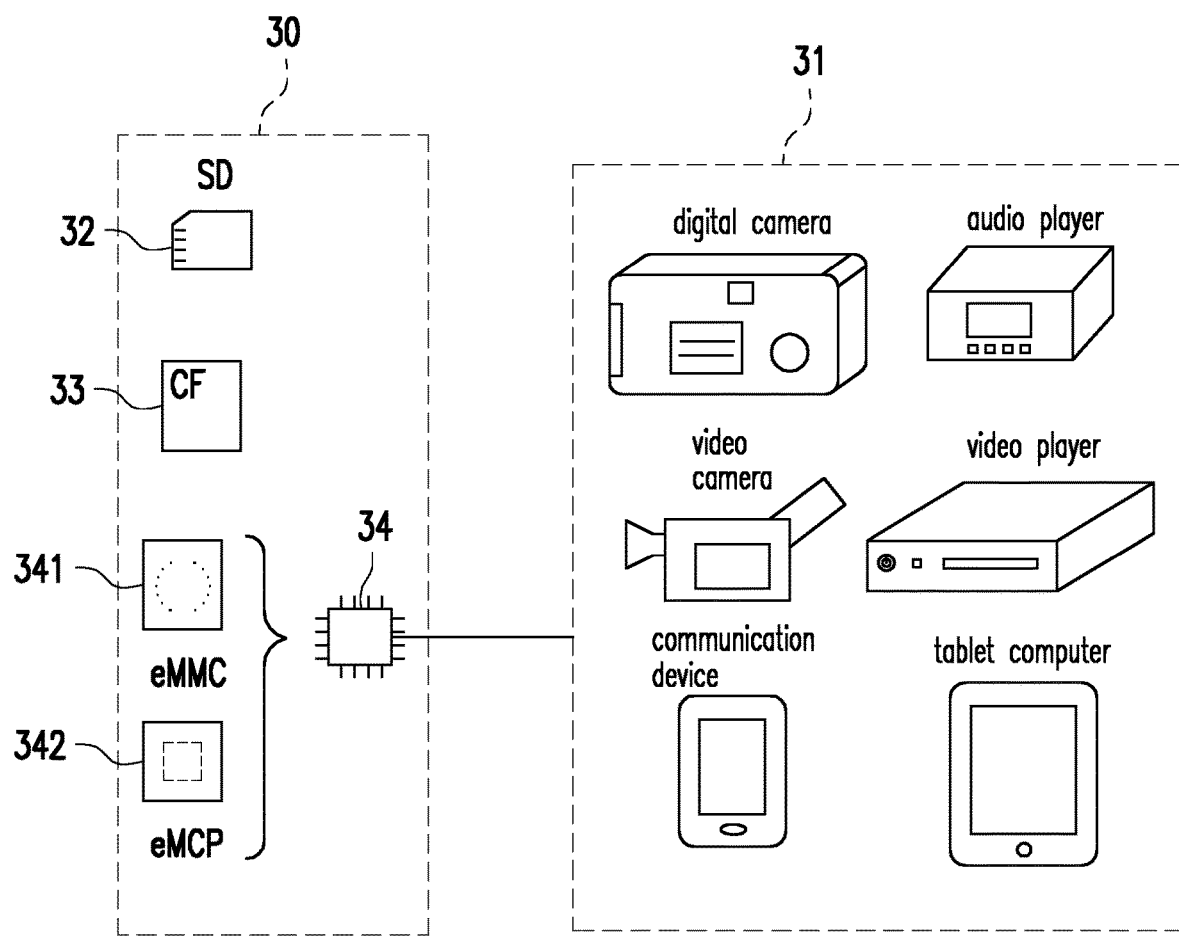
FIG. 3 is a schematic diagram illustrating a host system and a memory storage device according to another exemplary embodiment of the disclosure.

In an exemplary embodiment, the aforementioned host system may be any system capable of substantially cooperating with the memory storage device for storing data. The host system is illustrated as a computer system in the foregoing exemplary embodiment. However, FIG. 3 illustrates a host system and a memory storage device according to another exemplary embodiment of the disclosure. Referring to FIG. 3, in another exemplary embodiment, a host system 31 may be a system such as a digital camera, a video camera, a communication device, an audio player, a video player or a tablet computer, whereas a memory storage device 30 may be various non-volatile memory storage devices used by the host system 31, such as a SD (Secure Digital™) card 32, a CF (Compact Flash™) card 33 or an embedded storage device 34. The embedded storage device 34 includes various embedded storage devices capable of directly coupling a memory module onto a substrate of the host system 31, such as an eMMC™ (embedded Multi Media Card) 341 and/or an eMCP (embedded Multi Chip Package) storage device 342.

Figure 4:
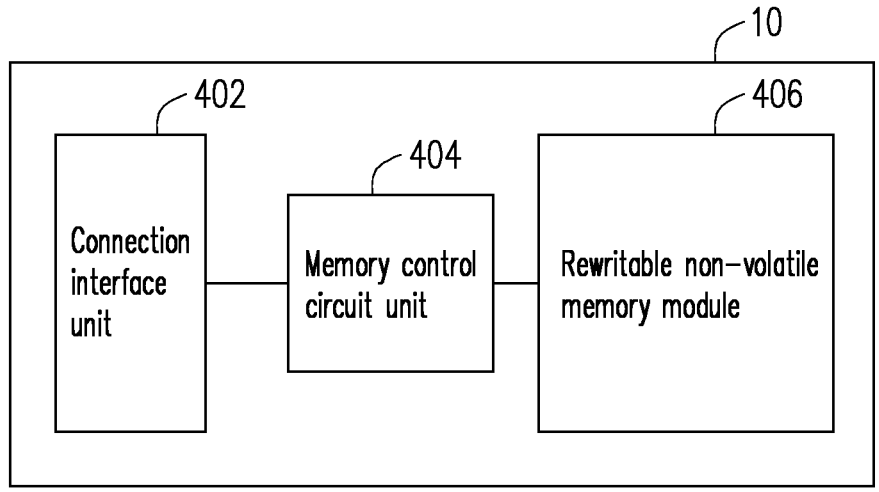
FIG. 4 is a schematic block diagram illustrating a memory storage device according to an exemplary embodiment of the disclosure.

FIG. 4 is a schematic block diagram illustrating a memory storage device according to an exemplary embodiment of the disclosure.

Referring to FIG. 4, the memory storage device 10 includes a connection interface unit 402, a memory control circuit unit 404 and a rewritable non-volatile memory module 406.

The connection interface unit 402 is configured to couple the memory storage device 10 to the host system 11. In the present exemplary embodiment, the connection interface unit 402 is compatible with a SATA (Serial Advanced Technology Attachment) standard. Nevertheless, it should be understood that the disclosure is not limited in this regard. The connection interface unit 402 may also be compatible with a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a SD™ interface standard, a UHS-I (Ultra High Speed-I) interface standard, a UHS-II (Ultra High Speed-II) interface standard, a MS (Memory Stick™) interface standard, a MCP interface standard, a MMC™ interface standard, an eMMC™ interface standard, a UFS (Universal Flash Storage) interface standard, an eMCP interface standard, a CF™ interface standard, an IDE (Integrated Device Electronics) interface standard or other suitable standards. The connection interface unit 402 and the memory control circuit unit 404 may be packaged into one chip, or the connection interface unit 402 is distributed outside of a chip containing the memory control circuit unit 404.

The memory control circuit unit 404 is configured to implement a plurality of logic gates or control commands in a hardware form or in a firmware form and perform operations, such as writing, reading or erasing data in the rewritable non-volatile memory module 406 according to the commands of the host system 11.

The rewritable non-volatile memory module 406 is coupled to the memory control circuit unit 404 and configured to store data written from the host system 11. The rewritable non-volatile memory module 406 may be a SLC (Single Level Cell) NAND flash memory module (i.e., a flash memory module capable of storing one bit in one memory cell), a MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), other flash memory modules or any memory module having the same features.

In the rewritable non-volatile memory module 406, one or more bits are stored by changing a voltage (hereinafter, also known as a threshold voltage) of each of the memory cells. More specifically, in each of the memory cells, a charge trapping layer is provided between a control gate and a channel. The amount of electrons in the charge trapping layer may be changed by applying a write voltage to the control gate thereby changing the threshold voltage of the memory cell. This operation of changing the threshold voltage of the memory cell is also known as "writing data into the memory cell" or "programming the memory cell". By changing the threshold voltage, each of the memory cells in the rewritable non-volatile memory module 406 can have a plurality of storage states. The storage state to which the memory cell belongs may be determined by applying a read voltage to the memory cell, so as to obtain the one or more bits stored in the memory cell.

In the present exemplary embodiment, the memory cells of the rewritable non-volatile memory module 406 constitute a plurality of physical programming units, and the physical programming units constitute a plurality of physical erasing units. Specifically, the memory cells on the same word line constitute one or more of the physical programming units. If each of the memory cells can store two or more bits, the physical programming units on the same word line can be at least classified into a lower physical programming unit and an upper physical programming unit. For instance, a least significant bit (LSB) of one memory cell belongs to the lower physical programming unit, and a most significant bit (MSB) of one memory cell belongs to the upper physical programming unit. In general, in the MLC NAND flash memory, a writing speed of the lower physical programming unit is higher than a writing speed of the upper physical programming unit, and/or a reliability of the lower physical programming unit is higher than a reliability of the upper physical programming unit.

In the present exemplary embodiment, the physical programming unit is a minimum unit for programming. That is, the physical programming unit is the minimum unit for writing data. For example, the physical programming unit is a physical page or a physical sector. If the physical programming unit is a physical page, these physical programming units usually include a data bit area and a redundancy bit area. The data bit area includes multiple physical sectors configured to store user data, and the redundant bit area is configured to store system data (e.g., management data such as an error correcting code, etc.). In the present exemplary embodiment, the data bit area includes 32 physical sectors, and a size of each physical sector is 512 bytes (B). However, in other exemplary embodiments, the data bit area may also include 8, 16 or a different number (more or less) of physical sectors, and the size of each physical sector may also be greater or smaller. On the other hand, the physical erasing unit is the minimum unit for erasing. Namely, each physical erasing unit contains the least number of memory cells to be erased together. For instance, the physical erasing unit is a physical block.

Figure 5:
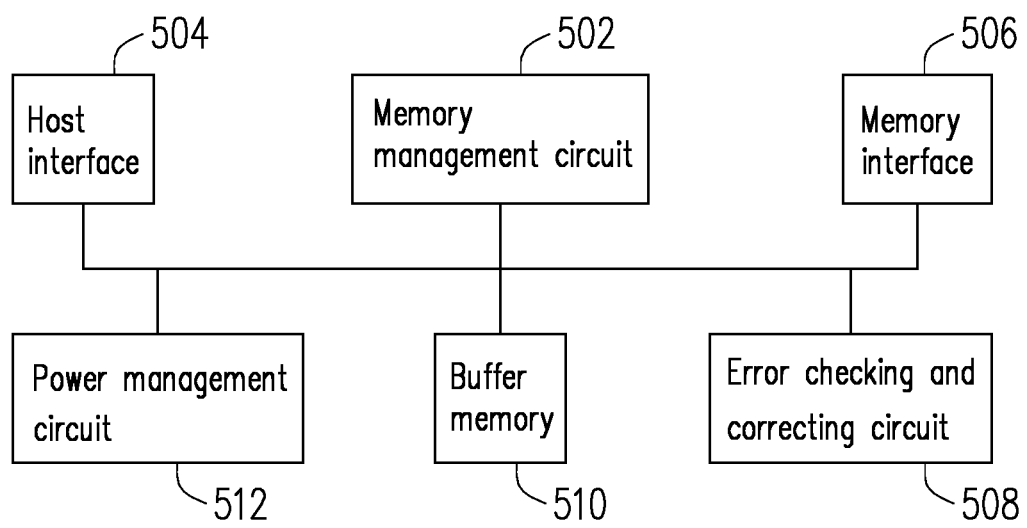
FIG. 5 is a schematic block diagram illustrating a memory control circuit unit according to an exemplary embodiment of the disclosure.

FIG. 5 is a schematic block diagram illustrating a memory control circuit unit according to an exemplary embodiment of the disclosure.

Referring to FIG. 5, the memory control circuit unit 404 includes a memory management circuit 502, a host interface 504 and a memory interface 506.

The memory management circuit 502 is configured to control overall operations of the memory control circuit unit 404. Specifically, the memory management circuit 502 executes a plurality of control commands. When the memory storage device 10 operates, the control commands are executed to perform various operations such as data writing, data reading and data erasing. Hereinafter, operations of the memory management circuit 502 are described as equivalent to operations of the memory control circuit unit 404.

In the present exemplary embodiment, the control commands of the memory management circuit 502 are implemented in a firmware form. For instance, the memory management circuit 502 has a microprocessor unit (not illustrated) and a ROM (not illustrated), and the control commands are burned into the ROM. When the memory storage device 10 operates, the control commands are executed by the microprocessor to perform operations of writing, reading or erasing data.

In another exemplary embodiment, the control commands of the memory management circuit 502 may also be stored as program codes in a specific area (for example, the system area in a memory exclusively used for storing system data) of the rewritable non-volatile memory module 406. In addition, the memory management circuit 502 has a microprocessor unit (not illustrated), a ROM (not illustrated) and a RAM (not illustrated). More particularly, the ROM has a boot code, which is executed by the microprocessor unit to load the control commands stored in the rewritable non-volatile memory module 406 to the RAM of the memory management circuit 502 when the memory control circuit unit 404 is enabled. Then, the control commands are executed by the microprocessor unit to perform operations, such as writing, reading or erasing data.

Further, in another exemplary embodiment, the control commands of the memory management circuit 502 may also be implemented in the form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured to manage the memory cells of the rewritable non-volatile memory module 406 or a group thereof. The memory writing circuit is configured to give a write command sequence for the rewritable non-volatile memory module 406 in order to write data into the rewritable non-volatile memory module 406. The memory reading circuit is configured to give a read command sequence for the rewritable non-volatile memory module 406 in order to read data from the rewritable non-volatile memory module 406. The memory erasing circuit is configured to give an erase command sequence for the rewritable non-volatile memory module 406 in order to erase data from the rewritable non-volatile memory module 406. The data processing circuit is configured to process both the data to be written into the rewritable non-volatile memory module 406 and the data read from the rewritable non-volatile memory module 406. Each of the write command sequence, the read command sequence and the erase command sequence may include one or more program codes or command codes, and may be used to instruct the rewritable non-volatile memory module 406 to perform the corresponding operations, such as writing, reading and erasing. In an exemplary embodiment, the memory management circuit 502 may further give command sequences of other types to the rewritable non-volatile memory module 406 for instructing the rewritable non-volatile memory module 406 to perform the corresponding operations.

The host interface 504 is coupled to the memory management circuit 502 and configured to receive and identify commands and data sent from the host system 11. In other words, the commands and data transmitted by the host system 11 are transmitted to the memory management circuit 502 via the host interface 504. In this exemplary embodiment, the host interface 504 is compatible with the SATA standard. Nevertheless, it should be understood that the disclosure is not limited in this regard. The host interface 504 may also compatible with the PATA standard, the IEEE 1394 standard, the PCI Express standard, the USB standard, the SD™ standard, the UHS-I standard, the UHS-II standard, the MS™ standard, the MMC™ standard, the eMMC™ standard, the UFS standard, the CF™ standard, the IDE standard, or other suitable standards for data transmission.

The memory interface 506 is coupled to the memory management circuit 502 and configured to access the rewritable non-volatile memory module 406. In other words, data to be written into the rewritable non-volatile memory module 406 is converted into a format acceptable by the rewritable non-volatile memory module 406 via the memory interface 506. Specifically, if the memory management circuit 502 intends to access the rewritable non-volatile memory module 406, the memory interface 506 sends corresponding command sequences. For example, the command sequences may include the write command sequence as an instruction for writing data, the read command sequence as an instruction for reading data, the erase command sequence as an instruction for erasing data, and other corresponding command sequences as instructions for performing various memory operations (e.g., changing read voltage levels or performing a garbage collection procedure). These command sequences are generated by the memory management circuit 502 and transmitted to the rewritable non-volatile memory module 406 through the memory interface 506, for example. The command sequences may include one or more signals, or data transmitted in the bus. The signals or the data may include command codes and program codes. For example, information such as identification codes and memory addresses are included in the read command sequence.

In an exemplary embodiment, the memory control circuit unit 404 further includes an error checking and correcting circuit 508, a buffer memory 510 and a power management circuit 512.

The error checking and correcting circuit 508 is coupled to the memory management circuit 502 and configured to perform an error checking and correcting operation to ensure the correctness of data. Specifically, when the memory management circuit 502 receives the write command from the host system 11, the error checking and correcting circuit 508 generates an ECC (error correcting code) and/or an EDC (error detecting code) for data corresponding to the write command, and the memory management circuit 502 writes data corresponding to the write command and the corresponding ECC and/or the EDC into the rewritable non-volatile memory module 406. Then, when the memory management circuit 502 reads the data from the rewritable non-volatile memory module 406, the corresponding ECC and/or the EDC are also read, and the error checking and correcting circuit 508 performs the error checking and correcting operation on the read data based on the ECC and/or the EDC.

The buffer memory 510 is coupled to the memory management circuit 502 and configured to temporarily store data and commands from the host system 11 or data from the rewritable non-volatile memory module 406. The power management unit 512 is coupled to the memory management circuit 502 and configured to control a power of the memory storage device 10.

Figure 6:
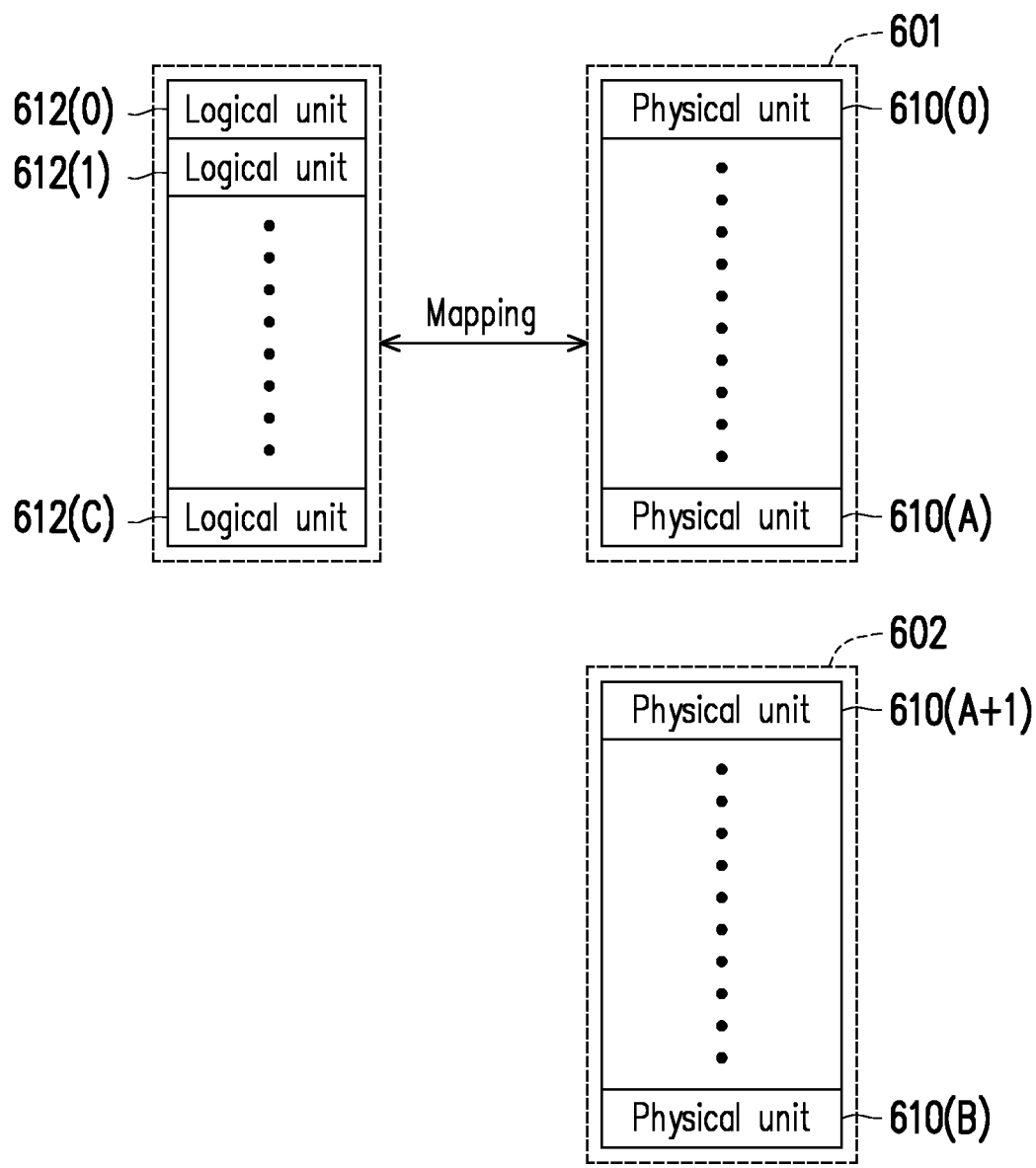
FIG. 6 is a schematic diagram illustrating management of a rewritable non-volatile memory module according to an exemplary embodiment of the disclosure.

FIG. 6 is a schematic diagram illustrating management of a rewritable non-volatile memory module according to an exemplary embodiment of the disclosure.

Referring to FIG. 6, the memory management circuit 502 illustrated in FIG. 5 logically groups physical units 610(0) to 610(B) of the rewritable non-volatile memory module 406 into a storage area 601 and a replacement area 602. The physical units 610(0) to 610(A) in the storage area 601 are configured to store data, and the physical units 610(A+1) to 610(B) in the replacement area 602 are configured to replace damaged physical units in the storage area 601. For example, if data read from one specific physical unit includes too many errors and these errors cannot be corrected, the specific physical unit is regarded as a damaged physical unit. It should be noted that, if there are no available physical erasing units in the replacement area 602, the memory management circuit 502 may declare the memory storage device 10 to be in a write protect state so data can no longer be written thereto.

In the present exemplary embodiment, each physical unit refers to one physical erasing unit. However, in another exemplary embodiment, one physical unit may also refer to one physical address, one physical programming unit, or a composition of a plurality of continuous or discontinuous physical addresses. The memory management circuit 502 assigns logical units 612(0) to 612(C) for mapping to the physical units 610(0) to 610(A) in the storage area 601. In the present exemplary embodiment, each logical unit refers to one logical address. However, in another exemplary embodiment, each logical unit may also refer to one logical programming unit, one logical erasing unit or a composition of a plurality of continuous or discontinuous logical addresses. In addition, each of the logical units 612(0) to 612(C) may also be mapped to one or more physical units.

The memory management circuit 502 records a mapping relation (a.k.a. a logical-physical address mapping relation) between the logical units and the physical units into at least one logical-physical address mapping table. When the host system 11 intends to read the data from the memory storage device 10 or write the data into the memory storage device 10, the memory management circuit 502 can perform a data accessing operation on the memory storage device 10 according to the logical-physical address mapping table.

It is noted that in the following description, some terms may be replaced with corresponding abbreviations for ease of reading (see Table 1).

TABLE 1

| rewritable non-volatile memory module | RNVM module |
| memory management circuit | MMC |

Figure 7:
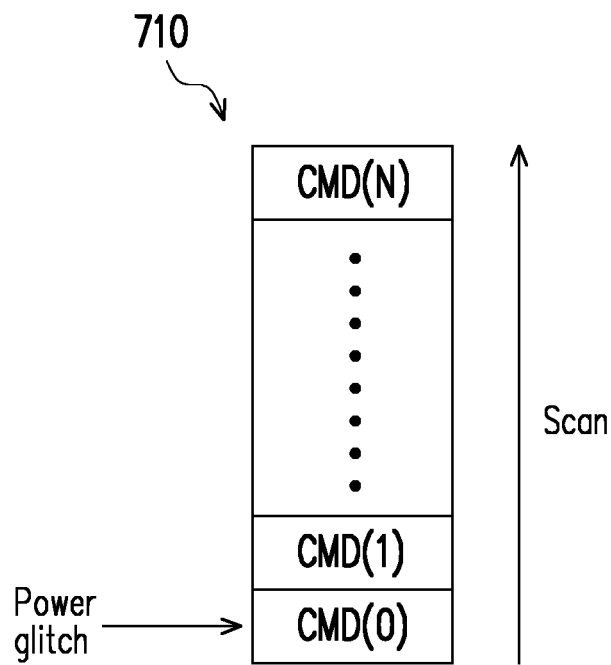
FIG. 7 is a schematic diagram illustrating a command queue according to an exemplary embodiment of the disclosure.
Figure 8:
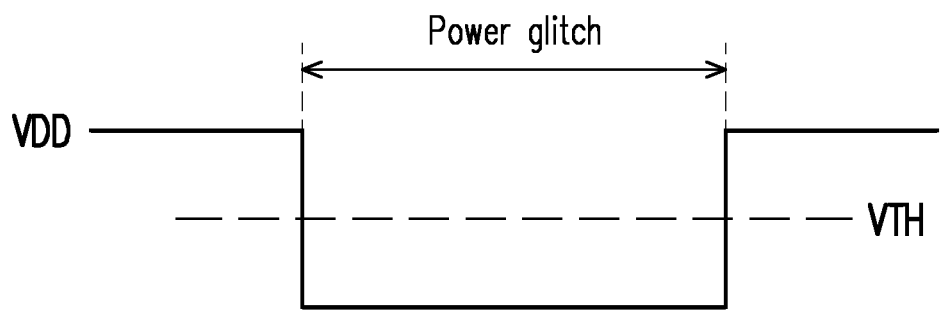
FIG. 8 is a schematic diagram illustrating a power glitch in accordance with an exemplary embodiment of the disclosure.

FIG. 7 is a schematic diagram illustrating a command queue according to an exemplary embodiment of the disclosure. FIG. 8 is a schematic diagram illustrating a power glitch in accordance with an exemplary embodiment of the disclosure.

With reference to FIG. 1, FIG. 4, FIG. 5, FIG. 7 and FIG. 8, a command queue 710 is configured in the buffer memory 510. In an exemplary embodiment, the command queue 710 is also known as a multi-trigger queue (MTQ). The MMC 502 can receive at least one command from the host system 11 and add the at least one command (e.g., commands CMD(0) to CMD(N)) received from the host system 11 into the command queue 710. The commands CMD(0) to CMD(N) may be arranged by an order of reception in the command queue 710. For example, in the command queue 710, the lowermost command CMD(0) is first received, and the uppermost command CMD(N) is last received. During operation of the MMC 502, the command CMD(0) may be executed first, and the command CMD(N) may be executed last. In an exemplary embodiment, the commands received from the host system 11 may also be temporarily stored in the buffer memory 510, and may then be added into the commands queue 710 according to a specific rule, so as to adjust an execution order for the received command.

In an exemplary embodiment, the commands CMD(0) to CMD(N) may include at least one of a write command, a erase command and a read command from the host system 11. The MMC 502 can send a write command sequence, which instructs the RNVM module 406 to perform a programming operation for storing data into the RNVM module 406, according to the write command. The MMC 502 can send an erase command sequence, which instructs the RNVM module 406 to perform an erasing operation for erasing data from the RNVM module 406, according to the erase command. The MMC 502 can send a read command sequence, which instructs the RNVM module 406 to perform a reading operation for reading data from the RNVM module 406, according to the read command. However, in another exemplary embodiment, the commands CMD(0) to CMD(N) may also include commands of other types from the host system 11, which are not particularly limited by the disclosure.

Under a normal power state (or a stable power state), a supply voltage VDD of the memory storage device 10 would be maintained at a normal voltage range (e.g., 1.65V to 3.6V), and the normal voltage range is higher than a voltage VTH (a.k.a. a default voltage value). As shown in FIG. 8, when a power glitch occurs, this power glitch would cause the supply voltage VDD to fall below the default voltage value VTH during a time period or range. After this time period or range has elapsed, the supply voltage VDD would return above the default voltage value VTH.

The MMC 502 can detect this power glitch. For example, the MMC 502 may be disposed with a voltage detector, and the voltage detector can detect whether the supply voltage VDD of the memory storage device 10 is below the default voltage value VTH. If the supply voltage VDD is below the default voltage value VTH, the MMC 502 determines that a power glitch occurs.

After the power glitch occurs, the MMC 502 can scan the command queue 710 and resume the command queue 710 according to a scan result. Taking FIG. 7 as an example, it is assumed that when the power glitch occurs, the MMC 502 can perform the scan from bottom to top, starting with the command CMD(0) currently being executed (or about to be executed) in the command queue 710. Based on a scanning and processing rule being set, the MMC 502 can directly resume the command queue 710 in the buffer memory 510 according to the scan result. In other words, after the power glitch occurs, there is no need to reset the command queue 710 so the system recovery efficiency can be accelerated when the power glitch occurs.

In an exemplary embodiment, the commands in the command queue 710 may include a first-type command and/or a second-type command. If the first-type command is found, the MMC 502 can suspend the scan and resume the command queue 710. If the second-type command is found, the MMC 502 can continue the scan on the command queue 710. In an exemplary embodiment, the first-type command may include the erase command and/or the write command, and the second-type command may include the read command. It should be noted that, in another exemplary embodiment, the first-type command may also include the read command, and second-type command may also include the erase command and/or the write command. The disclosure is not limited in this regard.

Figure 9A:
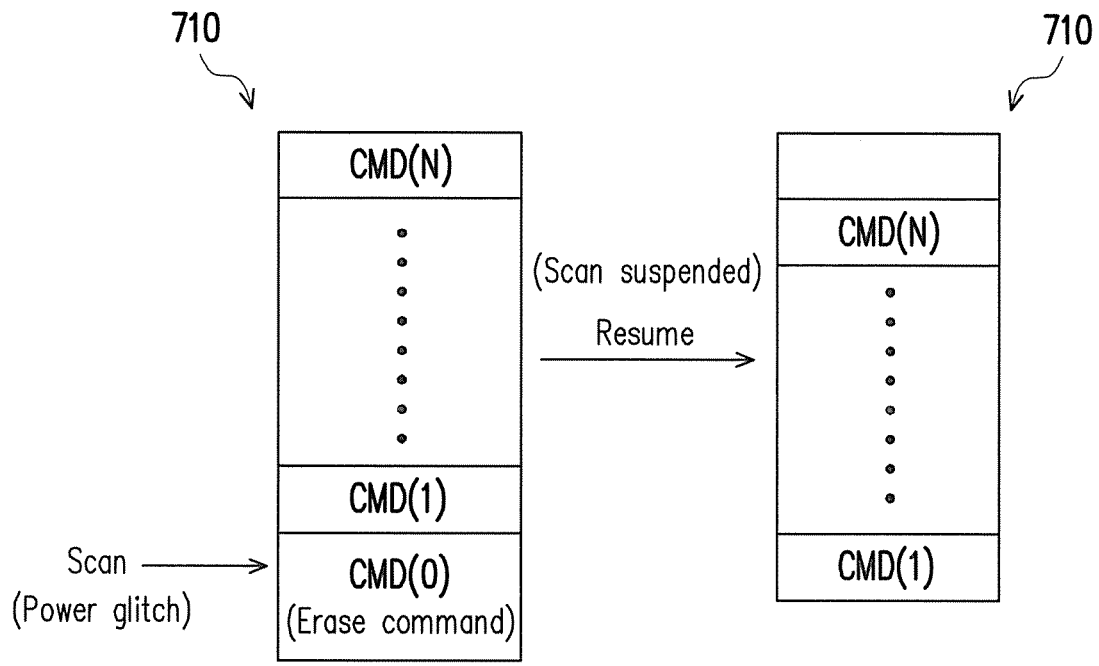
FIG. 9A illustrates a schematic diagram for scanning and resuming the command queue according to an exemplary embodiment of the disclosure.
Figure 9B:
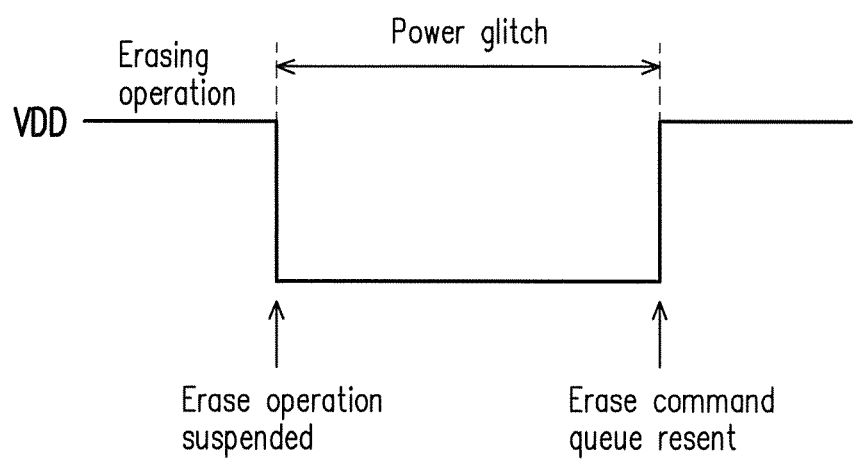
FIG. 9B is a schematic diagram illustrating a system operation performed in response to a power glitch according to an exemplary embodiment of the disclosure.

FIG. 9A illustrates a schematic diagram for scanning and resuming the command queue according to an exemplary embodiment of the disclosure. FIG. 9B is a schematic diagram illustrating a system operation performed in response to a power glitch according to an exemplary embodiment of the disclosure.

With reference to FIG. 4, FIG. 5, FIG. 9A and FIG. 9B, in response to a power glitch, the MMC 502 starts the scan on the command queue 710 from bottom to top. In the present exemplary embodiment, it is assumed that a scanned command (i.e., the CMD(0) of FIG. 7) is the erase command, which means that one erasing operation may currently be (or about to be) executed in response to this erase command before the power glitch occurs. Accordingly, when the power glitch is detected, the MMC 502 suspends this erasing operation (while this erasing operation may not have been completed yet). After recovering from the power glitch (i.e., the supply voltage VDD returns to the normal voltage range), the MMC 502 resends an erase command sequence according to this erase command to instruct the RNVM module 406 to restart the suspended erasing operation, as shown in FIG. 9B.

In response to the scanned command being an erase command, the MMC 502 suspends the scan on the command queue 710. After the scan is suspended, the MMC 502 resumes the command queue 710. For example, the MMC 502 can remove this erase command from the command queue 710 and update the command queue 710 according to the remaining commands CMD(1) to CMD(N), as shown in FIG. 9A.

Figure 10A:
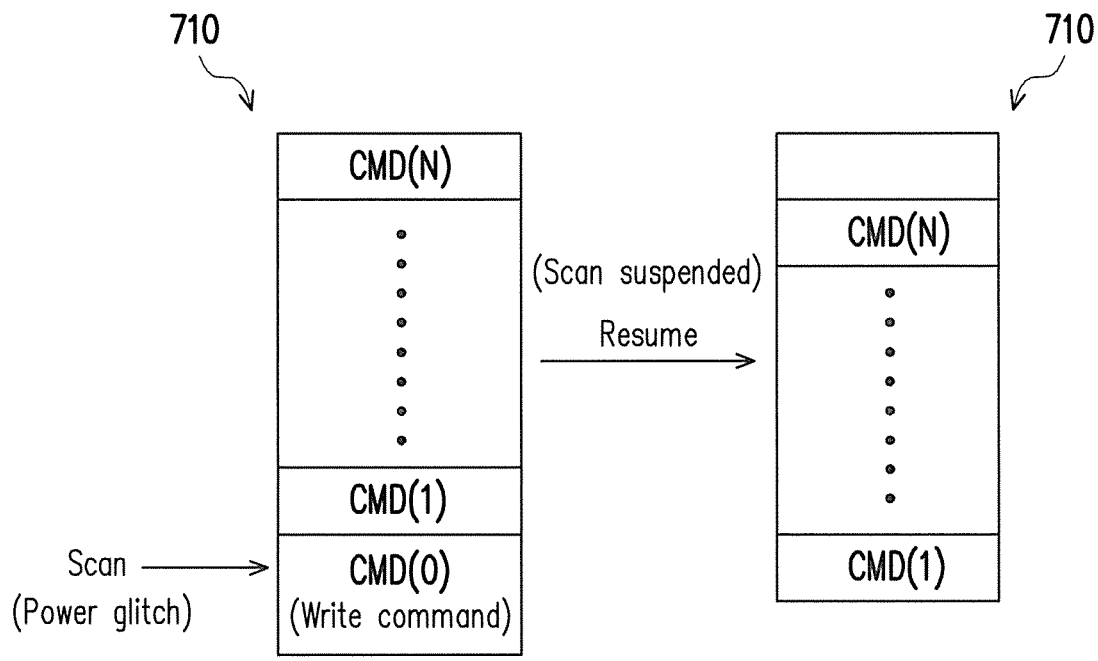
FIG. 10A illustrates a schematic diagram for scanning and resuming the command queue according to another exemplary embodiment of the disclosure.
Figure 10B:
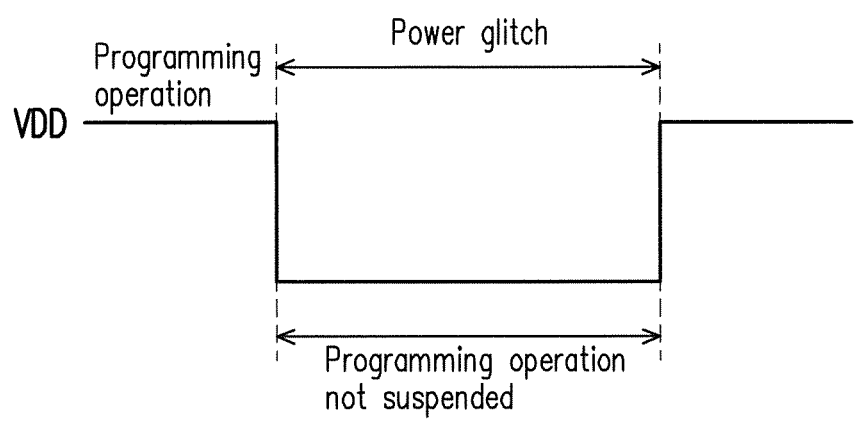
FIG. 10B is a schematic diagram illustrating a system operation performed in response to a power glitch according to another exemplary embodiment of the disclosure.

FIG. 10A illustrates a schematic diagram for scanning and resuming the command queue according to another exemplary embodiment of the disclosure. FIG. 10B is a schematic diagram illustrating a system operation performed in response to a power glitch according to another exemplary embodiment of the disclosure.

With reference to FIG. 5, FIG. 10A and FIG. 10B, in response to a power glitch, the MMC 502 starts the scan on the command queue 710 from bottom to top. In the present exemplary embodiment, it is assumed that a scanned command (i.e., the CMD(0) of FIG. 7) is the write command, which means that one programming operation may currently be (or about to be) executed in response to this write command before the power glitch occurs. It should be noted that, when the power glitch is detected, the MMC 502 may not suspend this programming operation but proceed with this programming operation, as shown in FIG. 10B.

In an exemplary embodiment, the MMC 502 can determine whether the scanned write command is a full sequential programming (FSP) command or a non-full sequential programming (non-FSP) command. If a scanned write command is the non-FSP command (e.g., a write command with command code being 8011), the MMC 502 can proceed with the programming operation corresponding to this command. However, if a scanned write command is the FSP command (e.g., a write command with command code being 8015), the MMC 502 can check a specific mark carried by this FSP command. This specific mark may be used to control whether to suspend other commands after the programming operation corresponding to this write command is completed. The MMC 502 can suspend other commands according to the specific mark after the programming operation corresponding to this write command is completed.

In an exemplary embodiment, when a power glitch is detected, the performed programming operation also includes backing up data in the buffer memory 510 (including data to be stored as instructed by this write command) to one specific physical unit. For example, this specific physical unit may have a faster write-in speed and/or a higher data reliability. For example, the MMC 502 may back up the data into this specific physical unit by using a fast page mode (or a SLC mode). The fast page mode and the SLC mode are used to store data into the memory cell by storing only one bit in one memory cell. The difference between these modes is that different programming voltages are being used. Later, if the recovery from the power glitch is not as expected, the data in this physical unit may be used to restore the memory storage device 10 to the previous working state after the normal power state is recovered (i.e., may be used to reset the command queue 710).

In an exemplary embodiment, in response to a scanned command being the write command, the MMC 502 suspends the scan on the command queue 710. After the scan is suspended, the MMC 502 resumes the command queue 710. For example, the MMC 502 can remove this write command from the command queue 710 and update the command queue 710 according to the remaining commands CMD(1) to CMD(N), as shown in FIG. 10A.

In general, the host system 11 can sequentially send out the non-FSP command and the FSP command in pairs, so as to instruct the RNVM module 406 to sequentially perform related programming operations. Therefore, in the command queue 710, the FSP command is often arranged after the non-FSP command. In an exemplary embodiment, if a non-FSP command is found, the MMC 502 can continue the scan on the command queue 710 to confirm whether there still exists the corresponding FSP command. If the FSP command is found, or the non-FSP command and the FSP command are found in sequence, the MMC 502 can suspend the scan on the command queue 710.

Figure 11A:
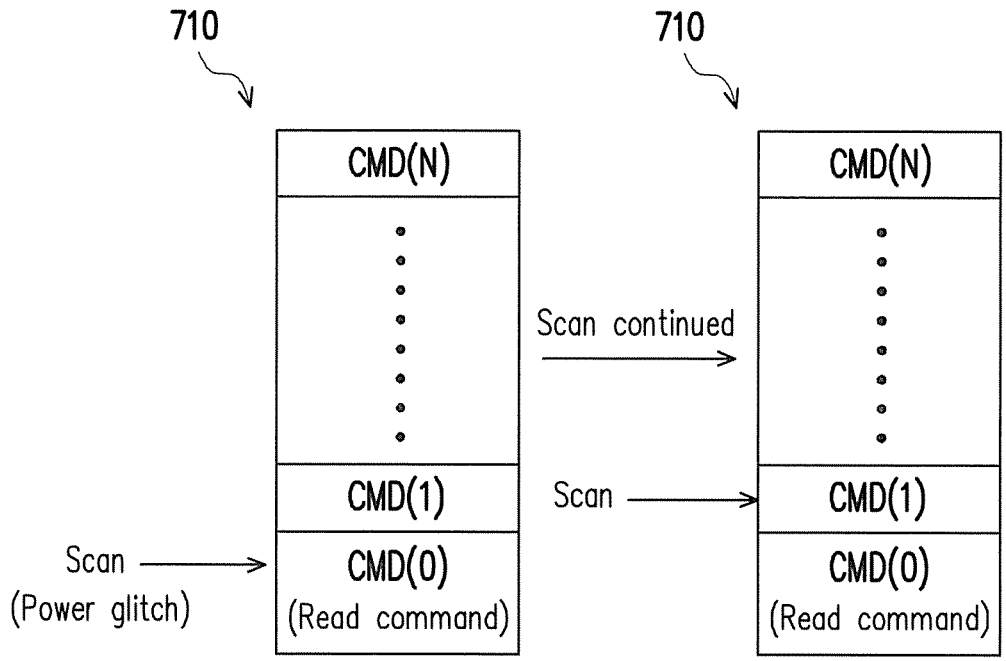
FIG. 11A illustrates a schematic diagram for scanning and resuming the command queue according to yet another exemplary embodiment of the disclosure.
Figure 11B:
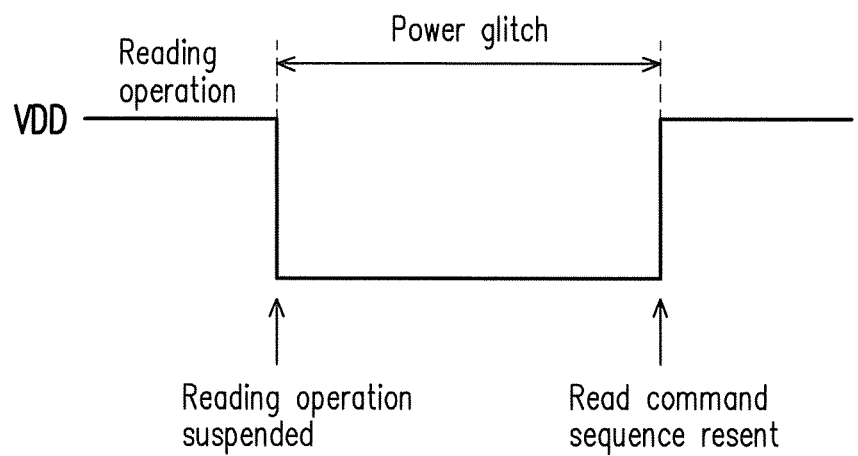
FIG. 11B is a schematic diagram illustrating a system operation performed in response to a power glitch according to yet another exemplary embodiment of the disclosure.

FIG. 11A illustrates a schematic diagram for scanning and resuming the command queue according to yet another exemplary embodiment of the disclosure. FIG. 11B is a schematic diagram illustrating a system operation performed in response to a power glitch according to yet another exemplary embodiment of the disclosure.

With reference to FIG. 4, FIG. 5, FIG. 11A and FIG. 11B, in response to a power glitch, the MMC 502 starts the scan on the command queue 710 from bottom to top. In the present exemplary embodiment, it is assumed that the scanned command (i.e., the CMD(0) of FIG. 7) is the read command, which means that one reading operation may currently be (or about to be) executed in response to this read command before the power glitch occurs. Accordingly, when the power glitch is detected, the MMC 502 suspends this reading operation (while this reading operation may not have been completed yet). After recovering from the power glitch (i.e., the supply voltage VDD returns to the normal voltage range), the MMC 502 resends a read command sequence according to this read command to instruct the RNVM module 406 to restart the suspended reading operation, as shown in FIG. 11B.

It should be noted that, if the scanned command is a read command and there are still commands to be scanned (e.g., the commands CMD(1) to CMD(N)) in the command queue 710, the MMC 502 continues the scan on the command queue 710 instead of directly suspending the scan. In other words, the MMC 502 can continue the scan on the next command (e.g., the command CMD(1)) in the command queue 710 in response to the scanned command being a read command, as shown in FIG. 11A.

If the next command being scanned is an erase command, the scan may be suspended and related operations similar to those described in the exemplary embodiment of FIG. 9A and FIG. 9B may be performed. If the next command being scanned is a write command, the scan may also be suspended and related operations similar to those described in the exemplary embodiment of FIG. 10A and FIG. 10B may be performed. In addition, if the next command being scanned is a read command, the scan may continue to scan the next command and related operations similar to those described in the exemplary embodiment of FIG. 11A and FIG. 11B may be performed.

Figure 12A:
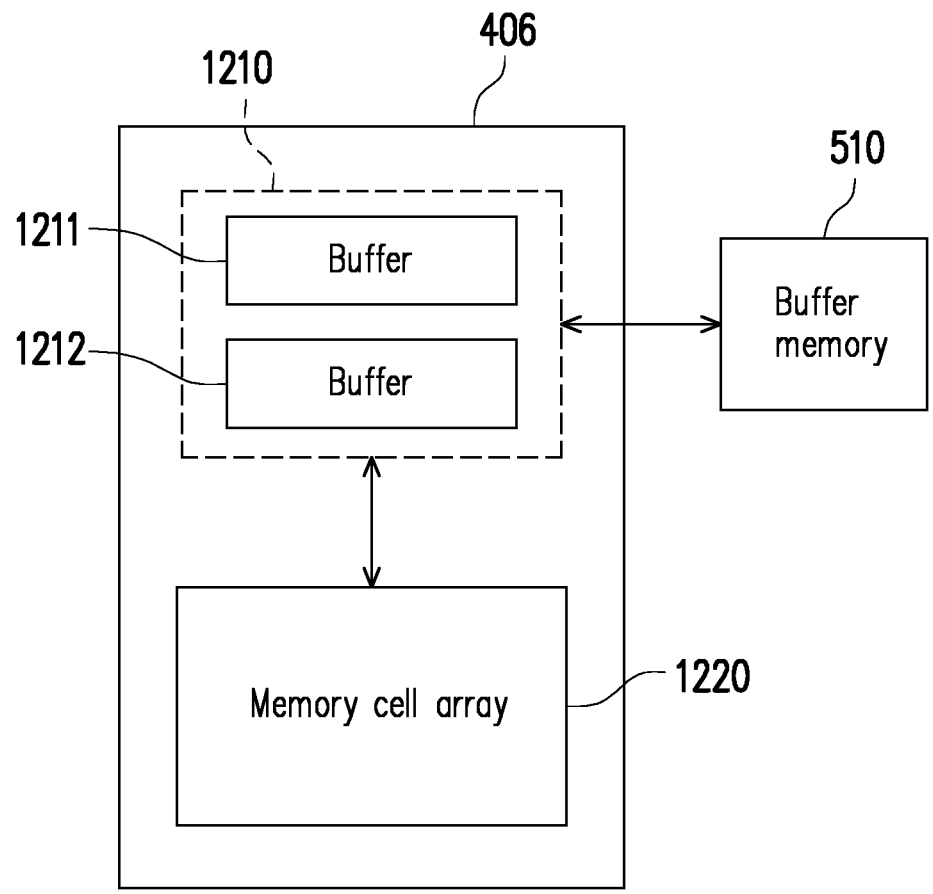
FIG. 12A is a schematic diagram illustrating a rewritable non-volatile memory module according to an exemplary embodiment of the disclosure.
Figure 12B:
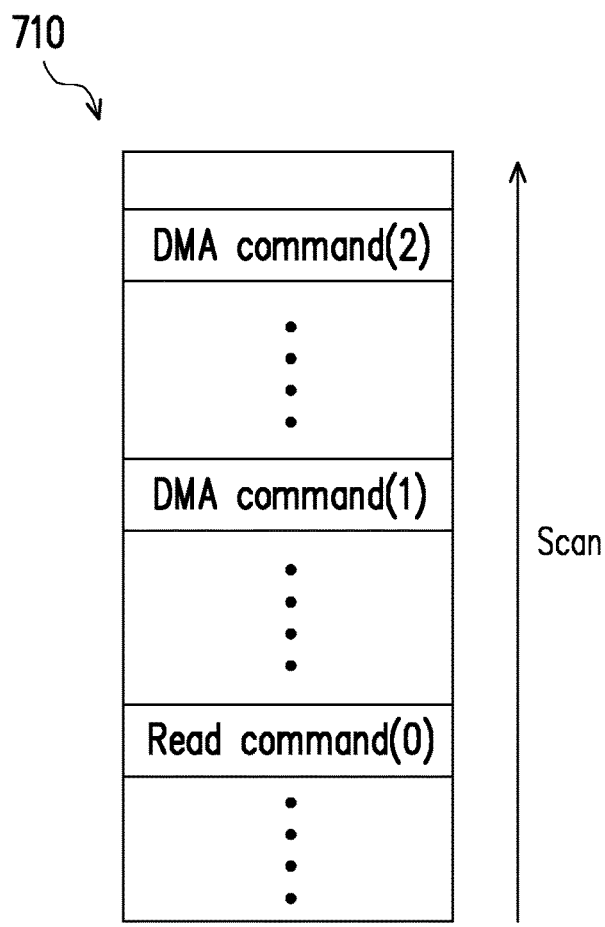
FIG. 12B illustrates a schematic diagram for scanning the command queue according to an exemplary embodiment of the disclosure.
Figure 12C:
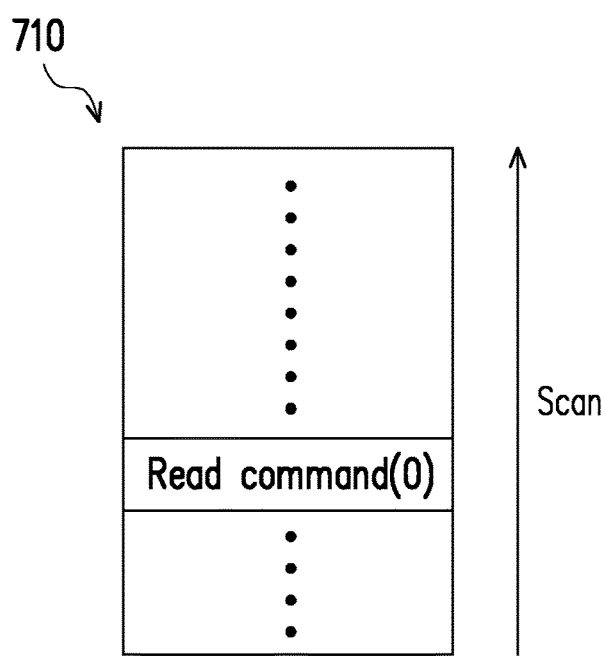
FIG. 12C illustrates a schematic diagram for scanning the command queue according to another exemplary embodiment of the disclosure.

FIG. 12A is a schematic diagram illustrating a RNVM module according to an exemplary embodiment of the disclosure. FIG. 12B illustrates a schematic diagram for scanning a command queue according to an exemplary embodiment of the disclosure. FIG. 12C illustrates a schematic diagram for scanning a command queue according to another exemplary embodiment of the disclosure.

With reference to FIG. 5, FIG. 7 and FIG. 12A, a RNVM module 406 may include a buffer area 1210 and a memory cell array 1220.

In an exemplary embodiment, the read commands in the command queue 710 may be further classified into a (common) read command and a read DMA (Direct Memory Access) command. According to the (common) read command, the MMC 502 can send a corresponding read command sequence to instruct the RNVM module 406 to read data (a.k.a. first data) from the memory cell array 1220 to the buffer area 1210. According to the read DMA command, the MMC 502 can send a corresponding read command sequence to instruct the RNVM module 406 to transmit the first data in the buffer area 1210 to the buffer memory 510, so as to be ready for transmitting such data to the host system 11.

In an exemplary embodiment, if a (common) read command (a.k.a. a first read command) is found and at least one read DMA command corresponding to the first read command is found subsequently, the MMC 502 can invalidate the first read command. After recovering from the power glitch, the MMC 502 would ignore the first read command, and resend a read command sequence according to the read DMA command corresponding to this first read command to instruct the RNVM module 406 to restart the suspended reading operation.

Taking FIG. 12A and FIG. 12B as an example, it is assumed that, after a read command (0) is found in the command queue 710, a read DMA command (1) and a read DMA command (2) corresponding to the read command (0) are further found. The read DMA command (1) and the read DMA command (2) corresponding to the read command (0) already existing in the command queue 710 indicates that the data (e.g., the first data) to be read as instructed by the read command (0) has already been read from the memory cell array 1220 to the buffer area 1210. In this case, the MMC 502 can invalidate the read command (0). It should be noted that, if the read command (0) is invalidated, then after recovering from the power glitch, the MMC 502 would not resend the read command sequence which instructs the RNVM module 406 to read the first data from the memory cell array 1220 to the buffer area 1210, according to the read command (0). Instead, after recovering from the power glitch, the MMC 502 can directly send a corresponding read command sequence according to the read DMA command (1) and the read DMA command (2), so as to instruct the RNVM module 406 to read the first data from the buffer area 1210 to the buffer memory 510.

In an exemplary embodiment, if a (common) read command (a.k.a. a second read command) is found and at least one read DMA corresponding to the second read command is not found subsequently, then after recovering from the power glitch, the MMC 502 can resend a read command sequence according to this second read command, so as to instruct the RNVM module 406 to restart the suspended reading operation.

Taking FIG. 12A and FIG. 12C as an example, it is assumed that, before the scan on the command queue 710 is suspended, one read command (0) is found but the read DMA command corresponding to the read command (0) is not found. Therefore, after recovering from the power glitch, the MMC 502 can send a corresponding read command sequence according to the read command (0), so as to instruct the RNVM module 406 to read the first data from the memory cell array 1220 to the buffer area 1210.

It should be noted that, in the exemplary embodiment of FIG. 12A and FIG. 12B, it is assumed that the buffer area 1210 includes buffers 1211 and 1212. The read DMA command (1) is configured to instruct the RNVM module 406 to transmit a part of the first data from the buffer 1211 to the buffer memory 510, and the read DMA command (2) is configured to instruct to transmit another part of the first data from the buffer 1212 to the buffer memory 510. In an exemplary embodiment of FIG. 12B, the read command sequence sent according to the read DMA command (1) and the read DMA command (2) is also known as a multi or multiple plane read command sequence, and the multi or multiple plane read command sequence can instruct the RNVM module 406 to transmit data through a plurality of memory planes (or channels) in parallel.

In an exemplary embodiment, the MMC 502 can determine whether to suspend the scan according to whether the read DMA commands being found are enough for generating at least one multiple plane read command sequence. For example, in an exemplary embodiment of FIG. 12B, if the read DMA command (1) and the read DMA command (2) could be used for generating one multiple plane read command sequence, then the scan on the command queue 710 may be suspended after the read DMA command (1) and the read DMA command (2) are found. Alternatively, in an exemplary embodiment of FIG. 12B, when the read DMA command (1) is found, the next command in the command queue 710 may then be scanned.

In another exemplary embodiment of FIG. 12A, if the buffer area 1210 includes more buffers (e.g., three buffers), the scan may be suspended after three read DMA commands corresponding to the first data are found. After recovering from the power glitch, the multiple plane read command sequence may be generated according to the three read DMA commands to instruct the RNVM module 406 to access data through multiple memory planes (or channels) in parallel.

In an exemplary embodiment, it is also possible to make other rules for suspending the scan (i.e., the scan operation). Taking FIG. 7 as an example, if the command queue 710 is empty, i.e., if there are no commands to be scanned in the command queue 710, or the scanned command is a dummy command (e.g., a dummy multi trigger parameter (MTP)), then the scan on the command queue 710 may be suspended.

From another perspective, after the power glitch occurs, the MMC 502 can select at least one command (a.k.a. a first command) among the commands temporarily stored in the buffer memory 510 and resend a corresponding command sequence according to the selected command to instruct the RNVM module 406 to perform a corresponding operation. In addition, after the power glitch occurs, the MMC 502 can ignore at least part of the commands (a.k.a. a second command) in the buffer memory 510. The MMC 502 would not resend a corresponding command sequence according to the ignored second command. For example, the first command may include the erase command of FIG. 9A, the read command of FIG. 11A, the read DMA command (1) and the read DMA command (2) of FIG. 12A and the read command (0) of FIG. 12B, and the second command may include the write command of FIG. 10A and the read command (0) of FIG. 12A. In an exemplary embodiment, after the power glitch occurs, the MMC 502 may also resend corresponding command sequences according to other commands in the buffer memory 510 but not located within the command queue 710.

Figure 13:
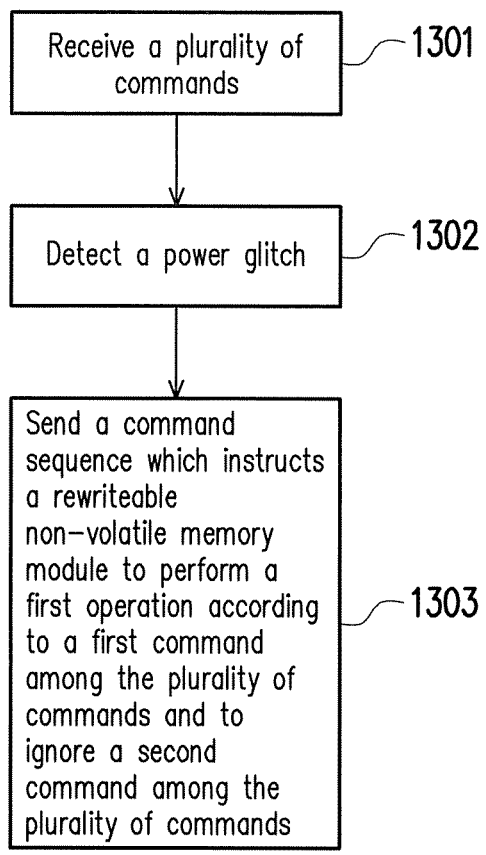
FIG. 13 is a flowchart illustrating a memory management method according to an exemplary embodiment of the disclosure.

FIG. 13 is a flowchart illustrating a memory management method according to an exemplary embodiment of the disclosure. With reference to FIG. 13, in step S1301, a plurality of commands are received. In step 1302, a power glitch is detected. After the power glitch occurs, in step S1303, a command sequence which instructs a rewriteable non-volatile memory module to perform a first operation is sent according to a first command among the plurality of commands, and a second command among the plurality of commands is ignored.

The steps depicted in FIG. 13 are described in detail as above, thus description thereof is omitted hereinafter. It should be noted that, the steps depicted in FIG. 13 may be implemented as a plurality of program codes or circuits. The disclosure is not limited in this regard. Moreover, the method disclosed in FIG. 13 may be implemented together with above exemplary embodiments, or may be implemented separately, which are not particularly limited in the disclosure.

In summary, after at least one command is received, the command may be added into the command queue. A power glitch may be detected. After the power glitch occurs, the command queue may be scanned and the command queue may be resumed according to the scan result. In addition, after the power glitch occurs, a command sequence can be selectively resent according to part of the commands (i.e., a first command) in the command queue, and another part of the commands (i.e., a second command) can be ignored. Compared with the traditional system that needs to be reset when a power glitch occurs, with the mechanism of rapidly resuming the command queue, described in the exemplary embodiments of the disclosure, the system recovery efficiency of the memory storage device may be improved when a power glitch occurs.

The previously described exemplary embodiments of the present disclosure have the advantages aforementioned, wherein the advantages aforementioned are not required in all versions of the disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A memory management method for a memory storage device comprising a rewritable non-volatile memory module, the memory management method comprising:
   receiving a plurality of commands sent from a host system;
   detecting a power glitch;
   after detecting the power glitch, determining whether a write command among the plurality of commands is a full sequential programming command or a non-full sequential programming command;
   proceeding with a programming operation corresponding to the write command if the write command is the non-full sequential programming command;
   checking a specific mark in the full sequential programming command if the write command is the full sequential programming command, and suspending other commands among the plurality of commands according to the specific mark after the programming operation corresponding to the write command is completed;
   after recovering from the power glitch, sending a command sequence to the rewriteable non-volatile memory module which instructs the rewritable non-volatile memory module to perform a first operation according to a first command among the plurality of commands; and
   ignoring a second command among the plurality of commands, whereby a command sequence corresponding to the second command is not sent to the rewriteable non-volatile memory module.

2. The memory management method of claim 1, wherein the plurality of commands are temporarily stored in a command queue in a buffer memory of the memory storage device, and wherein sending the command sequence comprises:
   determining whether one of the plurality of commands, which is currently being executed in the command queue when the power glitch occurs, is the first command or the second command;
   if the one of the plurality of commands currently being executed when the power glitch occurs is the first command, resending the command sequence which instructs the rewritable non-volatile memory module to perform the first operation according to the first command after the power glitch occurs; and
   if the one of the plurality of commands currently being executed when the power glitch occurs is the second command, not resending the command sequence according to the second command after the power glitch occurs.

3. The memory management method of claim 2, wherein the first command comprises at least one of an erase command and a read command, and the second command comprises a write command.

4. The memory management method of claim 2, further comprising at least one of following operations:
   suspending an erasing operation corresponding to an erase command if the power glitch is detected; and
   suspending a reading operation corresponding to a read command if the power glitch is detected.

5. The memory management method of claim 2, wherein sending the command sequence further comprises:
   scanning the command queue;
   suspending a scanning of the command queue and resuming the command queue if a first-type command is found; and continuing the scanning if a second-type command is found.

6. The memory management method of claim 5, wherein the first-type command comprises at least one of an erase command and a write command, and the second-type command comprises a read command.

7. The memory management method of claim 2, wherein sending the command sequence further comprises:
scanning the command queue;
if an erase command is found, sending an erase command sequence to the rewritable non-volatile memory module according to the erase command;
if a first read command and at least one read direct memory access (DMA) command corresponding to the first read command are found, invalidating the first read command, and sending a first read command sequence to the rewritable non-volatile memory module according to the at least one read DMA command; and
if a second read command is found and at least one read DMA corresponding to the second read command is not found, sending a second read command sequence to the rewritable non-volatile memory module according to the second read command.

8. A memory storage device, comprising:
a connection interface unit, configured to be coupled to a host system;
a rewritable non-volatile memory module; and
a memory control circuit unit, coupled to the connection interface unit and the rewritable non-volatile memory module, wherein the memory control circuit unit is configured to:
receive a plurality of commands from the host system through the connection interface unit;
detect a power glitch;
after detecting the power glitch, determine whether a write command among the plurality of commands is a full sequential programming command or a non-full sequential programming command;
proceed with a programming operation corresponding to the write command if the write command is the non-full sequential programming command;
check a specific mark in the full sequential programming command if the write command is the full sequential programming command, and suspend other commands among the plurality of commands according to the specific mark after the programming operation corresponding to the write command is completed;
after recovering from the power glitch, send a command sequence to the rewriteable non-volatile memory module which instructs the rewritable non-volatile memory to perform a first operation according to a first command among the plurality of commands; and
ignore a second command among the plurality of commands after the recovering from the power glitch, whereby the memory control circuit unit does not send a command sequence corresponding to the second command to the rewriteable non-volatile memory module.

9. The memory storage device of claim 8, wherein the plurality of commands are temporarily stored in a command queue in a buffer memory of the memory storage device, and the memory control circuit unit sending the command sequence comprises:
determining whether one of the plurality of commands, which is currently being executed in the command queue when the power glitch occurs, is the first command or the second command;
if the one of the plurality of commands currently being executed when the power glitch occurs is the first command, resending the command sequence which instructs the rewritable non-volatile memory module to perform the first operation according to the first command after the power glitch occurs; and
if the one of the plurality of commands currently being executed when the power glitch occurs is the second command, not resending the command sequence according to the second command after the power glitch occurs.

10. The memory storage device of claim 9, wherein the first command comprises at least one of an erase command and a read command, and the second command comprises a write command.

11. The memory storage device of claim 9, wherein the memory control circuit unit is further configured to perform at least one of following operations:
suspending an erasing operation corresponding to an erase command if the power glitch is detected; and
suspending a reading operation corresponding to a read command if the power glitch is detected.

12. The memory storage device of claim 9, wherein the memory control circuit unit sending the command sequence further comprises:
scanning the command queue;
suspending a scanning of the command queue and resuming the command queue if a first-type command is found; and
continuing the scanning if a second-type command is found.

13. The memory storage device of claim 12, wherein the first-type command comprises at least one of an erase command and a write command, and the second-type command comprises a read command.

14. The memory storage device of claim 9, wherein the memory control circuit unit sending the command sequence comprises:
scanning the command queue;
if an erase command is found, sending an erase command sequence to the rewritable non-volatile memory module according to the erase command;
if a first read command and at least one read direct memory access (DMA) command corresponding to the first read command are found, invalidating the first read command, and sending a first read command sequence to the rewritable non-volatile memory module according to the at least one read DMA command; and
if a second read command is found and at least one read DMA corresponding to the second read command is not found, sending a second read command sequence to the rewritable non-volatile memory module according to the second read command.

15. A memory control circuit unit for controlling a rewritable non-volatile memory module, wherein the memory control circuit unit comprises:
a host interface configured to be coupled to a host system;
a memory interface, configured to be coupled to the rewritable non-volatile memory module;
a buffer memory; and
a memory management circuit, coupled to the host interface, the memory interface and the buffer memory, wherein the memory management circuit is configured to:
receive a plurality of commands from the host system through the host interface;

detect a power glitch;

after detecting the power glitch, determine whether a write command among the plurality of commands is a full sequential programming command or a non-full sequential programming command;

proceed with a programming operation corresponding to the write command if the write command is the non-full sequential programming command;

check a specific mark in the full sequential programming command if the write command is the full sequential programming command, and suspend other commands among the plurality of commands according to the specific mark after the programming operation corresponding to the write command is completed;

after recovering from the power glitch, send a command sequence to the rewriteable non-volatile memory module which instructs the rewritable non-volatile memory to perform a first operation according to a first command among the plurality of commands; and ignore a second command among the plurality of commands after the recovering from the power glitch, whereby the memory management circuit does not send a command sequence corresponding to the second command to the rewriteable non-volatile memory module.

16. The memory control circuit unit of claim 15, wherein the plurality of commands are temporarily stored in a command queue in the buffer memory, and the memory management circuit sending the command sequence further comprises:

determining whether one of the plurality of commands, which is currently being executed in the command queue when the power glitch occurs, is the first command or the second command;

if the one of the plurality of commands currently being executed when the power glitch occurs is the first command, resending the command sequence which instructs the rewritable non-volatile memory module to perform the first operation according to the first command after the power glitch occurs; and if the one of the plurality of commands currently being executed when the power glitch occurs is the second command, not resending the command sequence according to the second command after the power glitch occurs.

17. The memory control circuit unit of claim 16, wherein the first command comprises at least one of an erase command and a read command, and the second command comprises a write command.

18. The memory control circuit unit of claim 16, wherein the memory management circuit is further configured to perform at least one of following operations:

suspending an erasing operation corresponding to an erase command if the power glitch is detected; and suspending a reading operation corresponding to a read command if the power glitch is detected.

19. The memory control circuit unit of claim 16, wherein the memory management circuit sending the command sequence further comprises:

scanning the command queue;

suspending a scanning of the command queue and resuming the command queue if a first-type command is found; and continuing the scanning if a second-type command is found.

20. The memory control circuit unit of claim 19, wherein the first-type command comprises at least one of an erase command and a write command, and the second-type command comprises a read command.

21. The memory control circuit unit of claim 16, wherein the memory management circuit sending the command sequence further comprises:

scanning the command queue;

if an erase command is found, sending an erase command sequence to the rewritable non-volatile memory module according to the erase command;

if a first read command and at least one read direct memory access (DMA) command corresponding to the first read command are found, invalidating the first read command, and sending a first read command sequence to the rewritable non-volatile memory module according to the at least one read DMA command; and if a second read command is found and at least one read DMA corresponding to the second read command is not found, sending a second read command sequence to the rewritable non-volatile memory module according to the second read command.

* * * * *